Patented Jan. 20, 1953

2,626,238

UNITED STATES PATENT OFFICE 2,626,238

CONDITIONING WATER

Neal E. Artz, Elmwood Park, Ill., assignor to Corn Products Refining Company, New York, N. Y., a corporation of New Jersey No Drawing. Original application March 17, 1947, Serial No. 735,239, now Patent No. 2,497,062, dated February 14, 1950. Divided and this application February 1, 1950, Serial No. 141,859

5 Claims. (Cl. 210—23)

1

This invention relates to the preparation of alkali metal phytates. More particularly, it relates to the preparation of sodium phytate and potassium phytate from calcium or magnesium phytate or crude materials containing the same.

An object of the present invention is to provide a simple and effective method for the preparation of metal alkali phytates directly from calcium or magnesium phytate or crude materials containing the same.

Heretofore, sodium phytate, for example, has been prepared from metal phytates, such as calcium phytate, by first converting the calcium phytate to iron phytate. This is effected by dissolving the calcium phytate in hydrochloric acid of proper concentration and adding to such solution, a solution of ferric chloride in hydrochloric acid. Thereupon, iron phytate precipitates. The iron phytate, after being separated, is suspended in water and to this suspension is added a solution of sodium hydroxide, whereupon, insoluble ferric hydroxide is formed and remains in suspension in the alkaline solution. This is separated and the sodium phytate is recovered from the filtrate by adding alcohol thereto. This causes the sodium phytate to separate as a heavy sirup in the bottom layer. If the sirup is cooled somewhat below room temperature, or is allowed to stand for sometime at room temperature, crystals of sodium phytate may form thereupon.

My invention represents an improvement over such complicated procedure and by means of my invention, alkali phytate may be prepared directly from calcium or magnesium phytate or crude materials containing the same.

The process of the present invention comprises reacting phytin or calcium magnesium phytate or crude materials containing the same with a solution of alkali metal hydroxide at elevated temperature and recovering the metal alkali phytate; the ratio of phytate, which is a reactant, to alkali metal hydroxide to water being within a specific range.

Generally, the phytate and the alkali metal hydroxide are mixed together and then sufficient water is added to produce the desired concentration of alkali metal hydroxide in the resultant mixture.

The heat from the solution of the alkali metal hydroxide is generally sufficient to carry the reaction to completion if the reactants are mixed, as above described, and the temperature of the reaction mass usually attains a level of about 220° F. to 240° F. The ingredients may be mixed in any order as long as there is sufficient heat provided when the phytate is contacted with the

2 alkali metal hydroxide solution to complete the reaction. If a solution of alkali metal hydroxide is used, this must be hot when the phytate is added thereto. If the phytate is mixed with a cold solution of alkali metal hydroxide and the entire mixture heated, very low yields of metal alkali phytate result; also, depending upon the concentration of the alkali metal hydroxide, alkali phosphate is obtained.

If a solution of alkali metal hydroxide is used in the preparation of metal alkali phytate, in accordance with the present invention, the temperature of such solution should be at least about 200° F. when the phytate, which is a reactant, is added thereto. Under these conditions, the temperature of the reaction mass will rise to at least 220° F. The temperature of the reaction mass after the reaction has started should preferably be maintained within the range of 190° F. to 220° F. until the reaction is complete. If the temperature of the alkali metal hydroxide solution is much below about 200° F. when the phytate is mixed therewith, the reaction does not take place or proceeds too slowly to be practical. The temperature of the reaction mass, irrespective of the means employed to initiate the reaction, may exceed 220° F. without detrimentally affecting the reaction, but then there is danger that the reaction will be difficult to control.

The metal phytates which are satisfactory for the purposes of the present invention are obtained as precipitates from the treatment of acidic plant extracts, as for example, corn steep liquor with an alkalin material; such as, for example, calcium hydroxide or lime and magnesium hydroxide. Thus, when corn steep liquor or similar acidic extracts of plant materials are neutralized with calcium hydroxide or lime or magnesium hydroxide, the precipitates that form are crude salts of phytic acid comprising essentially calcium phytate or magnesium phytate or mixtures thereof. If calcium hydroxide or lime is used as a precipitant, the precipitate consists mainly of calcium phytate; but, since plant extracts always contain magnesium, some of this will be retained in the precipitate. If magnesium hydroxide is used as a precipitant, the precipitate consists mainly of magnesium phytate but a small amount of calcium may be contained therein.

While metal alkali phytates may be prepared satisfactorily, according to the method of the present invention, from magnesium phytate, they may be prepared from magnesium phytate more satisfactorily according to the method which forms the subject matter of copending application Serial No. 735,240, filed March 17, 1947, issued February 14, 1950 as U. S. Patent No. 2,497,062. Magnesium hydroxide, a product of the reaction between magnesium phytate and alkali metal hydroxide, as obtained at high temperatures used in the present invention is more difficult to separate, as by filtration, from the metal alkali phytate in solution than magnesium hydroxide obtained at lower temperatures.

The amount of alkali metal hydroxide and the amount of water present when the reaction is initiated may vary somewhat. If the amount of phytate is kept constant, the amounts of alkali metal hydroxide and water may vary as follows: For 5 parts of phytate, on a dry basis, the alkali metal hydroxide, on a dry basis, should be at least 6 parts and may range from 6 parts to 10 parts, and the amount of water should be at least 2 parts and may range from 2 parts to 20 parts. The preferred ratio when sodium hydroxide and calcium phytate are used, is 5 parts of calcium phytate to 8 parts of sodium hydroxide to 16 parts of water.

A considerable excess over the theoretical amount of alkali metal hydroxide should be used or the yield of alkali metal phytate is low. On the other hand, if too large an excess of alkali metal hydroxide is used, e. g., more than that specified above, no advantage is gained and the metal alkali phytate is more difficult to purify.

As to the amount of water, there must be enough present to dissolve the alkali metal hydroxide and there must also be sufficient water present to produce a somewhat fluid mixture, so that the reaction may proceed uniformly throughout the mixture. If too much water is used, the alkalinity of the solution is reduced to a point where the reaction does not go to completion.

After the ingredients are mixed together under proper conditions and the reaction is initiated, there should be allowed about 2 to 3 hours' time for the reaction to go to completion. During that time, the temperature of the reaction mass should preferably be maintained at least at about 190° F.

After the reaction has been completed, the mixture is allowed to cool until room temperature is reached. Water is then added to the reaction mixture which is in the form of a slurry. If not enough water is added, the slurry is too heavy to allow easy separation of the liquid phase from the solid phase and the alkali metal phytate may crystallize before the metal hydroxide, which precipitates as a result of the reaction between the phytate and alkali metal hydroxide, can be separated. On the other hand, if the solution is diluted too far, the reaction reverses itself and the resulting yield of alkali metal phytate is lower. Good results are obtained when the weight of the water added at this point is about 6 times the weight of the phytate employed as one of the reactants. If the mixture is allowed to stand for more than 3 hours after reaching room temperature, there is danger that the alkali metal phytate therein will crystallize and then recovery of such phytate from the remaining mixture is difficult to effect.

After the metal hydroxide has been separated from the slurry, as by filtration, centrifugation, and the like, and the metal hydroxide cake has been washed, alcohol is added to the clarified solution including the washings in amount, usually 10 percent to 25 percent of its volume, sufficient to produce the maximal separation of alkali metal phytate as a sirup. The mixture is then allowed to stand. Within a short time, the liquid will separate into two layers—the heavy alkali metal phytate layer being on the bottom. The upper layer is drawn off and saved for recovery of alcohol and excess alkali metal hydroxide, both of which may be reused in a subsequent reaction. The heavy alkali metal phytate layer, which is sirupy in nature, may be used directly or it may be dried by passing over heated rolls or it may be allowed to crystallize, and the alkali phytate crystals recovered in conventional manner.

If it is desired to obtain the alkali metal phytate in its crystalline form rather than as a sirup, the specific gravity of the solution, after removal of metal hydroxide, may be adjusted to about 1.20 to 1.25 under which conditions alkali metal phytate may crystallize therefrom. The addition of not more than 10 percent of its volume of ethyl alcohol, for example, to such a solution and stirring may cause separation of a larger crop of crystals of alkali metal phytate without causing the separation of two liquid phases.

The alkali metal phytate thus obtained may contain some free alkali metal hydroxide which changes to alkali carbonate on contact with air. If a product of greater purity is desired, the alkali metal phytate may be redissolved in water, alcohol added thereto and the resultant mixture treated, as above described.

Among the alcohols which may be employed for recovering alkali metal phytate, in accordance with the present invention, are methyl alcohol, ethyl alcohol and isopropyl alcohol.

Any grade of reactants may be used, the commercial grades being quite satisfactory.

Any equipment which is resistant to alkali and is provided with proper means of heat control is suitable for purposes of the invention.

The following examples which are intended as informative and typical only and not in a limiting sense will further illustrate the invention, which is intended to be limited only in accordance with the scope of the appended claims.

*Example 1.*—Commercial calcium phytate is prepared by adding lime to corn steep liquor in amount to adjust the pH value thereof to 5.2. The precipitate which forms is separated, washed and dried in conventional manner. One hundred grams of such commercial calcium phytate is mixed with 160 g. of flake sodium hydroxide in a beaker of one liter capacity. To this mixture is added slowly with stirring, during a 10 minute interval, 400 ml. of hot water. The mixture becomes quite hot, the temperature ranging from 220° F. to 240° F., depending upon the rate at which water is added, and will boil over the sides of the beaker if the water is added too rapidly.

After the water has been added, the mixture is allowed to stand until the temperature thereof reaches room temperature. The resulting slurry is then diluted to a volume of about 800 ml. with hot water, mixed completely and filtered or preferably centrifuged. To the clear filtrate, containing sodium phytate in solution, about one-fourth its volume of 95 percent ethyl alcohol is added. The solution is completely mixed and allowed to stand. Within 15 to 30 minutes, the liquid will have separated into two layers—the heavy sodium phytate layer being on the bottom. The upper layer is drawn off and saved for recovery of alcohol and excess alkali metal hydroxide. The sirup thus obtained may be used directly, or it may be dried by means of heated rolls to a white flaky product of low moisture content, or it may be dried to the anhydrous condition and ground to a powder.

*Example 2.*—Twenty-five grams of commercial calcium phytate, prepared as described in Example 1, is mixed with 40 g. of flake sodium hydroxide and thereto is added 100 ml. of hot water, the water being added a little at a time and with constant stirring. The mixture is kept hot, at a temperature of at least about 190° F., on the steam bath for 2 to 3 hours.

One hundred and fifty milliliters of hot water is now added to the reaction mixture with thorough mixing and the suspension is centrifuged. The supernatant liquid is drawn off and a second 200 ml. portion of hot water is stirred up with the precipitate to recover the material adhering to the precipitate. The suspension is centrifuged again and the liquid layer is drawn off into the same vessel that contains the original supernatant liquor. To the combined solutions is added about one-fourth its volume of ethyl alcohol, and then the mixture is stirred completely and allowed to stand. After one-half hour, the upper layer is drawn off and the sirup remaining is dissolved in 100 ml. of hot water. Thirty ml. of alcohol is added to restratify the sirup, which is then used as such or dried and ground to a powder. The sirup obtained here contains at least 80 percent of the total phytic acid phosphorus of the original phytate as sodium phytate, as determined by the method of Heubner and Stadler, Biochem. Z., 64, 422–37.

*Example 3.*—Commercial magnesium phytate was prepared by adding magnesium hydroxide to corn steep liquor in amount to adjust the pH value thereof to 6.5. The precipitate which formed was separated, washed, and dried in conventional manner. One hundred grams of such magnesium phytate was mixed with 180 g. of flake sodium hydroxide and 300 ml. of hot water was added slowly to the mixture, which was constantly stirred. The heat of solution and reaction was sufficient to raise the temperature of the mixture to its boiling point. This mixture was more fluid than when calcium phytate is treated in a like manner. After standing for 3 hours, 300 ml. of water was added thereto and the solids were filtered off. The filtrate contained 95 percent of the original phytic acid phosphorus, as determined by the aforementioned method, and when one-fourth the volume of the filtrate of ethyl alcohol was added, the typical sodium phytate sirup formed.

*Example 4.*—To 25 grams of commercial calcium phytate, prepared according to Example 1, and 50 g. of potassium hydroxide, 50 ml. of hot water was added. The mixture became very hot and after standing for 2 hours, it was diluted with 50 ml. of water and filtered and the cake was washed. To the combined filtrate and washings one-fourth volume of ethyl alcohol was added, which caused a heavy sirup to settle out. The supernatant liquor was drawn off and the sirup layer was dried to a glassy material that was ground to a white, somewhat hygroscopic powder. This was alkaline when dissolved, and when solutions of metal salts, such as calcium chloride, were treated with the solution, typical insoluble metal phytates were formed.

*Example 5.*—Twenty-five liters of sodium phytate liquor, prepared in accordance with the method described in Example 1, was clarified by centrifugation. The specific gravity of the clarified liquor was 1.23. To the liquor was added 2.5 liters of ethyl alcohol. The entire liquid was then stirred rapidly for 2 hours, during which time a jelly like mass of sodium phytate crystals formed. The crystals were separated by filtration, washed and air dried. The total weight of air dried crystals of sodium phytate obtained was 5,580 gms.

I have, also, discovered that sodium phytate is effective in the treatment of hard water. When small amounts of sodium phytate are added to hard water, scale formation is prevented when such water is heated; corrosion by such water is inhibited; and the formation of agglomerates of insoluble soaps is prevented when soap is added to such water. When larger amounts of sodium phytate are added to hard water, the hardness of such water may be completely obscured.

When sodium phytate is added in low concentration to hard water, a cloud is produced at first which increases as more sodium phytate is added. When a certain concentration of sodium phytate is attained, the cloud separates into a slight but discrete precipitate. Further addition of sodium phytate causes the dispersal of the precipitate, the reappearance of the cloud and eventually the resolution and complete dissappearance of the cloud, resulting in a clear solution.

The characteristics of water treated with sodium phytate are altered depending upon the amount of added sodium phytate.

Thus, when sodium phytate is added to hard water in low concentration, the tendency to deposit a scale of precipitated salts is reduced. Such scale, when formed, interferes with heat transfer and reduces the amount of water-flow through the system.

The following examples show the tendency of sodium phytate to prevent incrustation due to calcium and magnesium salts in water.

*Example 6.*—Ordinary laboratory tap water (well water, Argo, Illinois) when boiled in an open flask began to cloud after boiling for about ½ hour, and by the end of 1 hour, the flask was coated with a tightly adhering layer of precipitated salts. Three samples of the same water to which sodium phytate, prepared in accordance with the present invention, had been added in concentrations of 10, 20 and 40 parts per million, respectively, were boiled in open flasks. These solutions became slightly cloudy, the one containing the greatest quantity of sodium phytate being most cloudy. On boiling for sometime, the cloud increased slightly but no material adhered to the flasks. Boiling was continued for 8 hours, during which time, as water boiled off, it was replaced with fresh tap water. Although all solutions by this time contained some suspended matter, this had not adhered to the flasks. After standing overnight, the solutions were poured out and the flasks showed no incrustation. Thus, the material which separates on heating hard water that has been treated with sodium phytate can be flushed out of the system readily.

*Example 7.*—In another experiment, hard water (well water, Argo, Illinois) to which had been added 250 parts per million of sodium phytate, prepared in accordance with the present invention, was boiled under reflux for 40 hours. The flocculent precipitate that formed remained in suspension throughout the boiling and poured out cleanly at the end of the boiling period. A sample of the same hard water without sodium phytate, treated in the same manner, resulted in a flask heavily encrusted with scale.

The next example demonstrates that water treated with sodium phytate is much less corrosive to iron than untreated water.

*Example 8.*—Iron nails placed in ordinary tap water (well water, Argo, Illinois) showed definite corrosion in 1 hour. The same kind of nails placed in portions of the same water to which sodium phytate, prepared in accordance with the present invention, had been added in concentrations of 25, 50, 100 and 200 parts per million showed no rusting after 24 hours. After standing in the treated water for 1 week, the nails in the solution containing 200 parts per million of sodium phytate showed no corrosion. Those that had stood in the phytate solutions of lower concentrations showed some rusting, the smaller the amount of sodium phytate employed, the greater the amount of corrosion. The nails in the untreated water were almost completely destroyed.

When sodium phytate is added to hard water in such concentration that a discrete precipitate is formed, the treated water exhibits unusual behavior upon the addition of soap. When titrated with soap solution by the standard method of the American Public Health Association, hard water, so treated, gives a slight but permanent lather when the amount of soap added is only that of the lather factor or a slightly greater amount. Although the water is not truly soft, it behaves in a manner similar to soft water. Further addition of soap does not result in the formation of curds of insoluble soap such as are produced when soap is added to hard water. Instead, a fine and light floc forms which is largely retained in the slight lather and does not adhere to the containing vessel. Deposits of insoluble soaps formed by reaction of soluble soaps with the calcium and magnesium salts of hard water, adhere to and are difficult to remove from glassware, lavatories, bath tubs and laundering equipment, whereas if the hard water has been treated first with sodium phytate, in an amount sufficient to form the slight precipitate described above, insoluble soaps either do not adhere to surfaces of contact or can be rinsed off easily.

The amount of sodium phytate necessary to produce the slight precipitate in hard water varies with the hardness of the particular water, but for waters of ordinary hardness the requirement usually lies between 100 and 300 parts per million. It is not necessary to know the hardness of the water or the exact amount of sodium phytate to add in order to obtain the desired precipitate, since if sodium phytate is placed in the container to which hard water is to be added, the desired precipitate is formed as soon as sufficient calcium and/or magnesium have been added in the form of the hard water. Once formed, the precipitate does not redissolve. Therefore, when soap is added, the precipitate exerts its dispersing action on the insoluble soap which otherwise would form a curd.

*Example 9.*—A 100 ml. portion of water, having a hardness of 200 parts per million as calcium carbonate, was treated with 1.5 ml. of 2 percent sodium phytate solution, the sodium phytate being prepared in accordance with the present invention. A distinct cloud formed, which soon separated as a light, flocculent precipitate. To this suspension, 0.5 ml. of standard soap solution (the lather factor for this soap solution) was added and the mixture was shaken vigorously. A light, but permanent lather formed. The solution was then diluted to 500 ml. with the original hard water and the solution again was shaken. A light lather formed and remained. Addition of 20 ml. of the soap solution did not alter the characteristics of the solution. When it was poured out of the flask, no insoluble soap adhered to the containing flask. When 20 ml. of the soap solution was added to 100 ml. of the untreated hard water, a definite precipitate of insoluble soap formed. This settled out of solution and a large portion of the precipitate adhered tightly to the flask and could not be rinsed off.

Although water treated with sodium phytate in small quantities, as described above, is not actually softened, hard water can be completely softened by the addition of sodium phytate. The amount of sodium phytate required depends upon the amount and kind of hardness of the particular water.

The following example demonstrates the softening of hard water with sodium phytate.

*Example 10.*—A 50 ml. sample of hard water that required 11.5 ml. of soap solution for complete softening (in addition to the lather factor of 0.5 ml.) corresponding to a hardness of 220 parts per million, was treated with 20 ml. of 2 percent sodium phytate solution, the sodium phytate being prepared in accordance with the present invention. When 0.5 ml. of the standard soap solution (the lather factor) was added to this sample of treated water, a full permanent lather formed.

Water that has been softened by the addition of sodium phytate remains soft after prolonged periods at the boiling temperature. This is not true of waters softened by sequestering agents, such as the sodium polyphosphates, as is demonstrated by the following example.

*Example 11.*—Water containing 200 parts per million of hardness as calcium carbonate, was treated with 4000 parts per million of sodium phytate, prepared in accordance with the present invention, the amount that had been found necessary to completely soften this water. A like sample of the same water was treated with 2000 parts per million of sodium hexametaphosphate, likewise the amount found necessary to completely soften the sample. Both the samples were boiled continuously under reflux and samples were withdrawn at intervals for determination of hardness. After boiling for 1 hour, 70 per cent of the hardness had returned to the sample that had been softened by sodium hexametaphosphate, and after being boiled 2½ hours, the sample had returned to its original hardness. However, the sample that had been softened by addition of sodium phytate remained completely soft after 48 hours at the boiling temperature.

One advantage of using sodium phytate for the purpose of preventing scale formation and of inhibiting the corrosive action of hard waters lies in the fact that this substance is much more stable to hydrolysis at boiling temperature or above than such substances as the sodium polyphosphates which are sometimes used for this purpose. Since the polyphosphates are quickly destroyed at boiling temperature or above, they must be added continuously to the water. If sodium phytate is used, once the desired concentration is attained, its effectiveness is retained over long periods of time, even when evaporated water is replaced by fresh, untreated water. The frequency of addition of the treating agent is therefore reduced as well as the total amount of treating agent required.

The following example demonstrates that sodium phytate is not only stable at boiling temperature but also that it is stable when a solution thereof is heated under pressure to higher temperatures.

*Example 12.*—Standard hard water (250 parts per million calcium carbonate hardness) softened with 1800 parts per million of sodium phytate to 55 parts per million calcium carbonate hardness, after being heated 2 weeks at 180° C. to 190° C., showed a reduction in apparent hardness to 14 parts per million calcium carbonate hardness. The pH value of the solution had dropped from 10 to about 8.

The same standard hard water (250 parts per million calcium carbonate hardness) softened with 1800 parts per million of commercial sodium hexametaphosphate to 10 parts per million calcium carbonate hardness, increased to 27 parts per million calcium carbonate hardness when heated for 4 hours at 180° C. and to 185 parts per million calcium carbonate hardness after 19½ hours. Water that had been softened to zero hardness by addition of 4000 parts per million of sodium phytate was subjected to a steam boiler test in a 10 pound steam boiler. After 6 days' operation and the addition of about 10 per cent unsoftened water, the hardness increased to 7 parts per million calcium carbonate.

The boiler test was discontinued after 48 days and examinations showed no scale formation of any type on new, scale free tubes. Old scale appeared to have been removed from the badly scaled crown and shell. The hardness of the boiler solution had increased from zero to 7 parts per million calcium carbonate hardness and there was no appreciable increase in total solids.

Sodium phytate, prepared in accordance with the present invention, may be used in the form of a sirup as recovered by alcohol, or it may be used in the form of a solution prepared by diluting such sirup to the desired concentration. Likewise, the sirup may be dried to a solid form of low moisture content and this solid may be used directly or solutions of a desired concentration may be prepared from it. Crystalline sodium phytate, obtained from its concentrated solutions, likewise may be used directly or in the form of solutions.

This application is a division of application Serial No. 735,239, filed March 17, 1947.

I claim:

1. Process of conditioning water which comprises adding to the water sodium phytate in amount ranging from 10 to 4000 parts per million.

2. The process of conditioning water to prevent the formation of adherent scale comprising adding to the water sodium phytate in amount ranging from about 10 to about 230 parts per million.

3. The process of conditioning water to prevent corrosion of iron in contact therewith comprising adding to the water sodium phytate in amount ranging from about 25 to about 200 parts per million.

4. The process of conditioning water to behave similarly to soft water and to prevent the formation of insoluble soap curd comprising adding to the water sodium phytate ranging in amount from about 100 to about 300 parts per million.

5. The process of softening hard water containing about 200 to about 250 parts per million calcium carbonate hardness comprising adding thereto sodium phytate in amount ranging from about 1800 to about 4000 parts per million.

NEAL E. ARTZ.

REFERENCES CITED

The following references are of record in the file of this patent:

UNITED STATES PATENTS

| Number | Name | Date |
|---|---|---|
| Re. 20,754 | Rosenstein | June 7, 1938 |
| 2,221,815 | Rice | Nov. 19, 1940 |
| 2,297,670 | Schroeder et al. | Sept. 29, 1942 |

OTHER REFERENCES

Biochemical Journal, vol. 40, pages 189–192, 1946.